June 20, 1961 A. V. BEDFORD 2,989,587

PICTURE SIGNAL APERTURE COMPENSATION

Filed Nov. 8, 1954

INVENTOR.
Alda V. Bedford
BY
[signature]
ATTORNEY

United States Patent Office 2,989,587
Patented June 20, 1961

2,989,587
PICTURE SIGNAL APERTURE COMPENSATION
Alda V. Bedford, Princeton, N.J., assignor to Radio Corporation of America, a corporation of Delaware
Filed Nov. 8, 1954, Ser. No. 467,437
17 Claims. (Cl. 178—7.2)

This invention relates to video signalling systems, and, more particularly to the compensation of image representative signals in an image scanning system for effective aperture loss in a direction perpendicular to the scanning lines.

Resolution of a pictorial representation such as a television picture is, in part, a function of the effective aperture of the video signal generating and reproducing apparatus. In the types of such apparatus generally employed at present, the effective apertures of the pickup and reproducing devices are defined by the spot sizes of the respective electron beams used to scan the targets of these devices. It is desirable to make the effective apertures as small as practicable in order to convey a maximum of picture detail information, but a large scanning spot in the reproducing device generally produces a brighter image.

Numerous systems using electrical filters have been designed and used to compensate for effective aperture loss in the direction of line scanning, which usually is the horizontal direction and shall be so considered for the purposes of the present description. However, the use of similar apparatus to compensate for effective aperture loss in a vertical direction has not heretofore been deemed practical. It has however been recognized that by suitably combining the information derived from a given scanning line, information representative of the immediately preceding and the immediately succeeding scanning lines, aperture compensation in the vertical direction may be achieved.

In accordance with the present invention, a novel and improved system is provided for carrying out aperture compensation in the vertical direction in the above-described manner. In accordance with a particular embodiment of the present invention, the scanning beam of an image pickup device is "wobbled" in the vertical direction to traverse regions of the scanned target above and below as well as on a given line of the scanning raster. By sampling the pickup tube output at appropriate instants, information may be separately derived concerning a given line, the preceding line, and the succeeding line in each line scanning interval. Combination of the respective information signals with appropriate amplitudes and polarities results in the production of a video signal output compensated for effective aperture loss in the vertical direction. A material improvement in the resolution of a picture reproduced in accordance with such a compensated video signal may be noted.

It is thus an object of the present invention to provide a novel and improved picture signal compensation system.

It is also an object of the present invention to improve picture resolution in a direction perpendicular to the scanning lines by providing novel means for compensating for effective aperture loss in this direction.

An additional object of the present invention is to provide novel means for generating video signals compensated for effective aperture loss in a vertical direction.

Other objects and advantages of the present invention may be readily ascertained upon a reading of the following detailed description and an inspection of the accompanying drawing in which.

Figure 1:
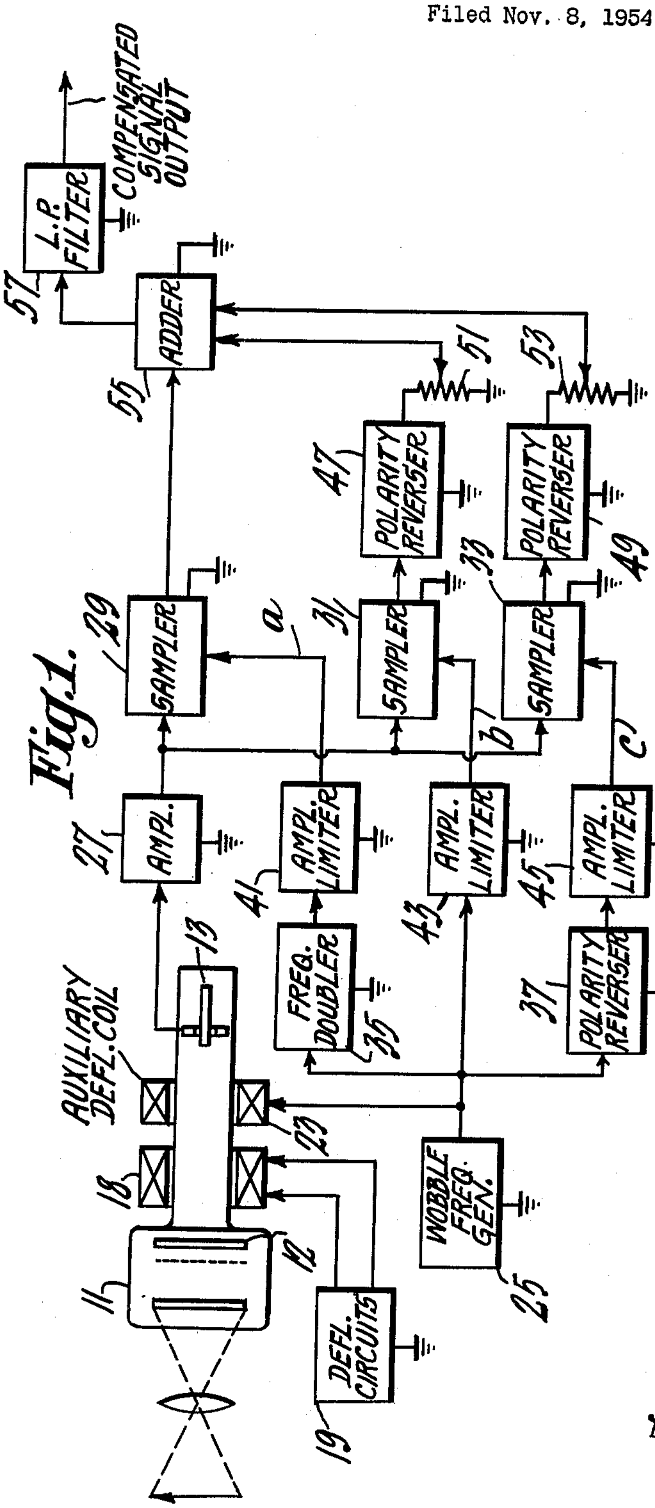
FIGURE 1 illustrates in block and schematic form video signal generating apparatus in which provision is made for aperture compensation in the vertical direction in accordance with an embodiment of the present invention.

Referring more particularly to FIGURE 1, there is illustrated an image pickup system including a conventional image pickup tube 11, including the usual electron gun 13, beam target 12 and beam deflection yoke 18. While the image pickup tube 11 has been illustrated as one of the well-known image orthicon type, it will be appreciated that the invention is applicable to numerous other forms of image scanning devices. The deflection yoke 18 is energized with the usual scanning waves developed in deflection circuits 19 and adapted to provide a conventional interlaced scanning raster.

Figure 2:
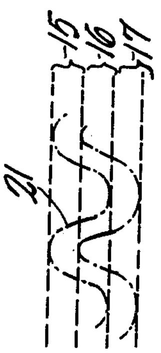
FIGURES 2 and 3 illustrate graphically the wobble path of the pickup tube scanning beam, and sampling waveforms, respectively, which aid in explaining the operation of the apparatus illustrated in FIGURE 1.

In FIGURE 2, three successive lines of a conventional interlaced scanning raster are represented by the bracketed regions outlined, with dotted-lines and labeled 15, 16 and 17. These represent, for purposes of example, the fifteenth, sixteenth and seventeenth lines of an interlaced scanning raster, the fifteenth and the seventeenth lines being normally traced during a different scanning field than the intermediate sixteenth line. The beam path 21 outlined in dot-dash lines in FIGURE 2 is illustrative, on a greatly exaggerated time scale, of the path traced by the scanning beam of pickup tube 11 relative to the conventional raster lines, in operation of the apparatus of FIGURE 1 in accordance with the principles of the present invention. The illustrated beam path 21 is representative of the beam path during the line scanning interval when energization of the yoke 18 would normally cause the tracing of raster line 16. It will be observed from FIGURE 2, that instead of tracing a straight line path, the beam oscillates in position about line 16, alternately passing upwardly to traverse the line 15 region and passing downwardly to traverse the line 17 region. It will be appreciated that the illustrated oscillation of the beam position in the vertical direction may be achieved by well-known vertical beam "wobbling" apparatus.

Thus, in FIGURE 1, auxiliary vertical deflection coil 23 is schematically illustrated as subjecting the beam to an auxiliary wobble deflection field. The auxiliary deflection coil 23 is energized with oscillations supplied by a wobble frequency generator 25. While the exact choice of the wobble frequency is not particularly critical, it is preferably higher than the maximum detail frequency required in the pickup tube output and may, for example, be a frequency of 9 mc.

Figure 3:
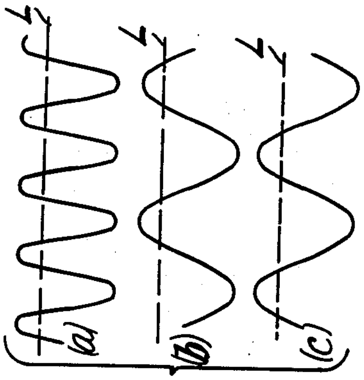

It will be appreciated from a study of FIGURE 2 that the video signal output of pickup tube 11, during the line scanning interval when line 16 is normally scanned, will contain information concerning the preceding line 15 and the succeeding line 17 interspersed with information concerning the nominally scanned line 16. This "composite" video signal output is applied through conventional amplifying apparatus 27 to the inputs of three samplers 29, 31 and 33. Sampling of the "composite" video signal in sampler 29 is carried out using a doubled wobble frequency sampling wave, derived by frequency doubling the output of generator 25 in a frequency doubler 35. This sampling waveform is illustrated by curve "*a*" of FIGURE 3. Sampling of the "composite" video signal is carried out in sampler 31 using the output of generator 25, without change in frequency, as the sampling wave. This sampling waveform is illustrated by curve "*b*" of FIGURE 3. Sampling of the "composite" video signal is also carried out in sampler 33 using a similar sampling waveform, reversed in polarity, however, relative to the sampling wave applied to sampler 31. The desired polarity reversal may be provided by application of the output of generator 25 through a conventional polarity reverser 37. The phase reversed wobble frequency sampling waveform is illustrated by curve "c" of FIGURE 3.

Amplitude limiters 41, 43 and 45 are indicated on the drawing as inserted in the paths of the respective sampling wave inputs to samplers 29, 31 and 33. The limiters convert the sinusoidal waveforms derived from the output of generator 25 to respective pulse waveforms, as indicated by the portions of each of the curves *a*, *b*, and *c* located above the dotted-line "L" in FIGURE 3. The phase of the double wobble frequency pulse waveform "*a*" is chosen or adjusted such that the pulses coincide with the recurring portions of the video signal output of pickup tube 11 corresponding to the central line of the wobble scan, i.e. with respect to the line scanning interval particularly considered in FIGURE 2, the pulses of waveform "*a*" providing sampling of the "composite" video signal at the recurring intervals when the signal is representative of the beam traversal of the central line 16 region. The pulses of waveform "*b*," on the other hand, coincide with video signal portions derived during the upper peaks of the beam wobble, when the line 15 region is scanned. The pulses of the phase reversed waveform "*c*" will thus coincide with the lower peaks of the beam wobble, when the line 17 region is scanned.

The outputs of samplers 29, 31 and 33 thus are separately represented of information concerning a different line of the line group 15, 16 and 17. The outputs of samplers 31 and 33, bearing the information concerning the lines adjacent to the central, nominally scanned line 16, are reversed in polarity in respective polarity reversers 47 and 49, suitably adjusted in amplitude by apparatus schematically represented by output potentiometers 51 and 53, and combined with the central line output of sampler 29 in adder 55.

It will be appreciated that the showing of attenuators 51 and 53 and the contrasting-absence of an attenuator in the coupling of sampler 29 to the adder 55 is but illustrative of means for adjusting the amplitudes of the adjacent line signals relative to the amplitude of the central line signal, and that the relative amplitude adjustment may be effected in various other ways, as by providing the respective signal paths with amplifying stages, the gain of the adjacent line signal amplifiers being less than the gain of the central line signal amplifier by a predetermined factor. As an example of relative signal amplitudes which may be employed to provide a desirable degree of compensation, the adjacent line signals effectively subtracted from the central line signal in adder 55 may be relatively attenuated by a ¼ factor with respect to the central line signal.

Application of the combined signal output of adder 55 to a low pass filter 57, which may for example have a passband of 0 to 4 mc. removes the spurious sampling frequency components therefrom. The output of filter 57 comprises a compensated video signal suitable for conventional utilization in the transmission of video information to remote receivers, or other well known video signalling system applications.

It is not the purpose of the present description to present a detailed explanation of the theory of vertical aperture compensation whereby subtraction of adjacent line information of appropriate amplitude from the information derived from the scanning of a given line results in the reduction of the effective aperture size in the vertical direction, such an explanation being given elsewhere. However, it is believed that those skilled in the art will upon analysis accept the concept that such operations do effect such a desired compensation. The advantages of providing such compensation are significant and readily appreciated. A noticeable improvement in vertical resolution may be achieved through the reduction of the effective aperture size in the vertical direction of the image pickup device. An image reproducing device utilizing such compensated signals will provide a picture with improved resolution in the vertical direction without requiring a reduction in its spot size. It may additionally be pointed out that through use of such vertical aperture compensation at the pickup device, an increase in spot size at the reproducer may thereby be tolerated (if desired, for example, to provide increased light output) without a deterioration of the vertical resolution from the grade attained with normal reproducer spot size and without aperture compensation. It will be appreciated that the beam wobble system described above for deriving adjacent line information for the compensating operations involves the addition of relatively simple and practical electronic apparatus to the usual image pickup equipment. The principles of the described aperture compensation system are readily applicable to most, if not all, of the image pickup devices known or presently contemplated for video signal generation, monochrome, color, or otherwise. It will also be appreciated that such details of the described system as the auxiliary deflection coil 23 are illustrative of a particular application of the principles of the present invention, and various modifications in such details, such as the omission of auxiliary deflection coil 23 and the super-position of the wobble frequency waves upon the usual vertical scanning waves applied to the main deflection yoke instead, may be made without departing from the scope of the present invention. In this regard, it may be particularly observed that the sampling system of FIGURE 1 is but illustrative of various forms of apparatus which may be utilized to separate the adjacent line information from the central line information contained in the pickup device output (so that they may be separately operated upon to achieve the desired compensation effects upon recombination) in carrying out the principles of the present invention.

It should also be noted that while the description has particularly concerned itself with the wobbling of the beam to strike both of the lines adjacent to the nominally scanned line, a less complete compensation may also be achieved where the beam is wobbled such as to intercept only one of the lines adjacent to the nominally scanned line. On the other hand, a more inclusive or coarse compensation may also be achieved where the wobble amplitude is such as to additionally intercept more remote areas beyond the immediately adjacent lines on either or both sides of the nominally scanned line. Alternatively the wobble amplitude may be reduced to intercept only the nearest portions of the adjacent line areas in order to provide a finer detail compensation.

As noted previously, the principles of the present invention are applicable to vertical aperture compensation with numerous forms of image pickup devices. It may be pointed out that where the vertical aperture compensation system of the present invention is utilized in conjunction with the pickup tube of a field sequential color camera a further advantage is realized. In the usual interlaced scanning operation of a field sequential color camera the target of the pickup device is charged in accordance with a different component color image during each successive field, and it is desired that the pickup tube signal output during each of the fields be selectively representative of the appropriate one of the plurality of component colors. However, where interlaced scanning is employed, the charge image developed on the target during the given field as representative of a given component color image is not necessarily fully discharged during that field, since only every other line of the scanning raster on the target is traced during that field. When it is desired during the next succeeding field to trace the intermediate scanning lines of the raster in the derivation of another component color signal, there is a possibility of a carry-over effect of the undischarged lines of charge image of the first component color, effectively diluting the second component color signal. However, where the wobble scanning of the present invention is employed, a substantial discharge of all of the lines of the scanning raster is effected during each field. Thereby, a significant reduction in the above-noted dilution effect may be noted. It is understood that in this type operation the only sampler required is the one indicated at 29 for selecting the signal at line 16, the excursions of the spot into lines 15 and 17 being required only to discharge the undesired charge image of the adjacent raster lines.

Having thus described the invention, what is claimed is:

1. In an image scanning system including an image pickup device comprising an electron beam source, a target for said electron beam, and beam deflection means adapted to cause said electron beam to trace on said target a scanning raster comprising a series of parallel scanning lines, aperture compensation apparatus comprising in combination means including said pickup device to provide during any given line scanning interval a pickup device output signal including recurring portions representative of picture information corresponding to a given line of said raster, and interspersed therewith, additional recurring portions representative of picture information corresponding to an area of said raster adjacent to said given line; and means coupled to said pickup device for deriving an aperture compensated video signal from said pickup device output signal, said latter means including means responsive to said pickup device output signal for altering the amplitude and polarity relationship of said adjacent area signal portions to said given line signal portions.

2. Aperture compensation apparatus in accordance with claim 1 wherein said pickup device output signal providing means includes auxiliary beam deflection means for causing a wobble of said electron beam in a direction perpendicular to the scanning lines of said raster throughout the tracing of said raster.

3. Aperture compensation apparatus in accordance with claim 1 wherein said polarity and amplitude relationship altering means comprises means for separating the recurring signal portions representative of said given line and the recurring signal portions representative of said adjacent area, and means for recombining the respective separated signal portions in said altered polarity and amplitude relationship.

4. In an image scanning system including an image pickup device comprising an electron beam source, a target for said electron beam, and beam deflection means adapted to cause said electron beam to trace on said target a scanning raster comprising a series of parallel scanning lines, aperture compensation apparatus comprising in combination means including said pickup device for providing during any given line scanning interval a pickup device output signal including respective recurring portions representative of picture information corresponding to a given line of said raster, at least a portion of the raster line preceding said given line, and at least a portion of the raster line succeeding said given line; and means coupled to said pickup device for deriving an aperture compensated video signal from said pickup device output signal, said latter means including means responsive to said pickup device output signal for altering the amplitude and polarity relationships of said preceding line and succeeding line signal portions to said given line signal portions.

5. Aperture compensation apparatus in accordance with claim 4 wherein said pickup device output signal providing means includes auxiliary beam deflection means for causing a wobble of said electron beam in a direction perpendicular to the scanning lines of said raster throughout the tracing of said raster.

6. Aperture compensation apparatus in accordance with claim 4 wherein said polarity and amplitude relationship altering means comprises means for separating the respective signal portions representative of said given line, said preceding line, and said succeeding line, and means for recombining the respective separated signal portions in said altered polarity and amplitude relationships.

7. In an image scanning system including an image pickup device comprising means for generating a beam of electrons, a target for said beam of electrons, and means for causing said beam of electrons to trace on said target a scanning raster comprising a series of parallel scanning lines, aperture compensation apparatus comprising in combination means for wobbling said beam of electrons in a direction perpendicular to the scanning lines of said raster at a predetermined wobble frequency, means for deriving from said pickup device in response to the wobbled scanning of said target a composite video signal including respective recurring portions representative during any given line scanning interval of information concerning a given line of said raster, a portion of the line preceding said given line, and a portion of the line succeeding said given line, means coupled to said deriving means for separating from said composite video signal the respective portions representative of the given line, the preceding line and the succeeding line, means for separately processing the separated video signal portions, and means for recombining the separately processed video signal portions.

8. Apparatus in accordance with claim 7 wherein said means for separately processing the respective video signal portions representative of preceding line and succeeding line information each include polarity reversing means.

9. In an image scanning system including an image pickup device comprising means for generating a beam of electrons, a target for said beam of electrons, and means for causing said beam of electrons to trace on said target a scanning raster comprising a series of parallel scanning lines, aperture compensation apparatus comprising in combination means for wobbling said beam of electrons in a direction perpendicular to the scanning lines of said raster at a predetermined wobble frequency, means for deriving from said pickup device in response to the wobbled scanning of said target a composite video signal including respective recurring portions representative during any given line scanning interval of information concerning a given line of said raster, a portion of the line preceding said given line, and a portion of the line succeeding said given line, means coupled to said deriving means and to said wobbling means for separating from said composite video signal the respective portions representative of the given line, the preceding line and the succeeding line, means for separately processing the separated video signal portions, and means for recombining the separately processed video signal portions, said separating means including a plurality of video signal samplers and means for rendering each of said signal samplers responsive to the composite video signal output of said image pickup device, one of said signal samplers receiving a sampling waveform having a frequency corresponding to twice said wobble frequency, and said means for separately processing the respective video signal portions representative of preceding line and succeeding line information each including polarity reversing means.

10. Apparatus comprising the combination of an image pickup tube including an electron beam source, a target structure, beam deflection means for providing a deflection field adapted to cause said electron beam to trace on said target a scanning raster comprising a series of parallel scanning lines, said electron beam having a predetermined effective aperture in a direction perpendicular to said scanning lines, auxiliary beam deflection means for providing an auxiliary deflection field adapted to cause said beam of electrons during the scanning of each of said lines to oscillate about the line scanned, said oscillations occurring at a predetermined frequency, the amplitude of said oscillations being of sufficient magnitude to cause said beam to traverse portions of the lines of the raster immediately adjacent to the line nominally scanned, means for deriving an output signal from said pickup tube in response to the aforesaid scanning of said target, a plurality of signal sampling means coupled to said deriving means, and to said auxiliary beam deflection means for sampling several different phases of said output signal, one of said signal sampling means selecting samples of said output signal at a rate corresponding to twice said predetermined frequency, another of said signal sampling means selecting different samples of said output signal at a rate corresponding to said predetermined frequency, and means for combining said selected samples in such an amplitude and polarity relationship therebetween as to improve said effective aperture.

11. Apparatus in accordance with claim 10 wherein a third one of said plurality of sampling means selects still different samples of said output signal at a rate corresponding to said predetermined frequency but in an antiphasal relationship to the sample selection of said second-named signal sampling means, and means for additionally applying said latter signal samples to said signal combining means in such amplitude and polarity relationships to the first and second-named signal samples as to improve said effective aperture.

12. Apparatus in accordance with claim 11 wherein the amplitude and polarity relationships between said first-named, second-named, and third-named signal samples are such that said second-named and third-named signal samples are combined with said first-named signal samples with a reversed polarity and a diminished amplitude relative to said first-named signal samples.

13. In an image signalling system including an image pickup device comprising an electron beam source, a target for said electron beam, and means for causing said electron beam to trace on said target a scanning raster comprising a series of parallel scanning lines, aperture compensation apparatus comprising means for deriving from said pickup device during each line scanning interval an output signal comprising three series of recurring signal portions interspersed in time, the recurring signal portions of one of said three series being responsive to the scanning of predetermined portions of a given line of said raster, the recurring signal portions of another of said three series being predetermined portions of the raster line preceding said given line, and the recurring signal portions of the remaining of said three series being predetermined portions of the raster line succeeding said given line, means coupled to said deriving means for altering the polarity and amplitude of those signal portions responsive to the scanning of said preceding and succeeding lines relative to the polarity and amplitude of the signal portions responsive to the scanning of said given line, and means coupled to said altering means for combining said altered signal portions with said signal portions responsive to the scanning of said given line to provide an aperture compensated output signal, said signal deriving means including means for wobbling said beam of electrons during the scanning of each of said raster lines.

14. Aperture compensation apparatus in accordance with claim 13 wherein said beam wobble is effected in a direction perpendicular to the scanning lines of said raster, at a predetermined wobble frequency, and with a peak-to-peak amplitude sufficient to cause said beam of electrons to intercept at least three successive lines of said raster during each wobble frequency cycle.

15. In an image signalling system including an image pickup device comprising an electron beam source, a target for said electron beam, and means for causing said electron beam to trace on said target a scanning raster comprising a series of parallel scanning lines, aperture compensation apparatus comprising means for deriving from said pickup device during each line scanning interval an output signal comprising three series of recurring signal portions interspersed in time, the reccuring signal portions of one of said three series being responsive to the scanning of predetermined portions of a given line of said raster, the recurring signal portions of another of said three series being predetermined portions of the raster line preceding said given line, and the recurring signal portions of the remaining of said three series being predetermined portions of the raster line succeeding said given line, means coupled to said deriving means for altering the polarity and amplitude of those signal portions responsive to the scanning of said preceding and succeeding lines relative to the polarity and amplitude of the signal portions responsive to the scanning of said given line, and means coupled to said altering means for combining said altered signal portions with said signal portions responsive to the scanning of said given line to provide an aperture compensated output signal, said signal deriving means including means for wobbling said beam of electrons during the scanning of each of said raster lines, said beam wobble being effected in a direction perpendicular to the scanning lines of said raster at a predetermined wobble frequency, and with a peak-to-peak amplitude sufficient to cause said beam of electrons to intercept at least three successive lines of said raster during each wobble frequency cycle, said altering means including means coupled to said wobbling means for sampling the output of said pickup tube at a sampling rate corresponding to twice said predetermined wobble frequency to select portions of said output responsive to the interception of the central line of said three successive lines, and means coupled to said wobbling means for sampling the output of said pickup tube at a sampling rate corresponding to said predetermined wobble frequency to select signal portions responsive to the scanning of a predetermined one of the lines adjacent to said center lines.

16. Aperture compensation apparatus in accordance with claim 15 wherein said altering means includes additional means coupled to said wobbling means for sampling the output of said pickup tube at a sampling rate corresponding to said predetermined wobble frequency to select signal portions responsive to the scanning of the other of the lines adjacent to said central line.

17. In an image scanning system including an image pickup device comprising means for generating a beam of electrons, an image target for said beam of electrons, and means for causing said beam of electrons to scan horizontal parallel strips of the target whereby signals are generated in accordance with the image on the target regions successively engaged by the beam of electrons, said beam of electrons having an undesirable effective aperture, aperture compensation apparatus comprising in combination beam controlling means for cyclically altering in a vertical direction at a relatively high frequency during the scanning of each of said strips the relationship of the target region engaged by the beam of electrons to the centerline of the strip scanned, and means coupled to and responsive to said beam controlling means for cyclically changing the amplification and polarity of the generated signals in synchronism with said changes in the region engaged so as to produce output signals in which the polarity of the signal portions generated in response to the scanning of regions of the target relatively far from the centerline of the strip is reversed relative to the polarity of the signal portions generated in response to the scanning of regions of the target relatively near to the centerline of the strip, whereby said effective aperture is improved.

References Cited in the file of this patent

UNITED STATES PATENTS

| | | |
|---|---|---|
| 2,757,236 | Bedford | July 31, 1956 |
| 2,759,044 | Oliver | Aug. 14, 1956 |